(12) United States Patent
Philibert et al.

(10) Patent No.: US 12,172,690 B2
(45) Date of Patent: Dec. 24, 2024

(54) CART/TRAY APPARATUS AND SYSTEM

(71) Applicant: METHOD INNOVATION PARTNERS INC., Surrey (CA)

(72) Inventors: Carl Philibert, Surrey (CA); Greg John O'Gorman, Surrey (CA)

(73) Assignee: METHOD INNOVATION PARTNERS INC., Surrey (CA)

( * ) Notice: Subject to any disclaimer, the term of this patent is extended or adjusted under 35 U.S.C. 154(b) by 34 days.

(21) Appl. No.: 18/102,528

(22) Filed: Jan. 27, 2023

(65) Prior Publication Data

US 2023/0249729 A1    Aug. 10, 2023

Related U.S. Application Data

(60) Provisional application No. 63/304,322, filed on Jan. 28, 2022.

(51) Int. Cl.
*B62B 3/00* (2006.01)

(52) U.S. Cl.
CPC .......... *B62B 3/002* (2013.01); *B62B 2501/04* (2013.01)

(58) Field of Classification Search
CPC ......... B62B 3/002; B62B 3/003; B62B 3/007; B62B 2501/04
See application file for complete search history.

(56) References Cited

U.S. PATENT DOCUMENTS

| | | | |
|---|---|---|---|
| 6,796,565 B2 * | 9/2004 | Choi | B62B 3/02 280/47.35 |
| 10,974,751 B2 * | 4/2021 | Ritucci | B62B 5/067 |
| 2006/0163828 A1 * | 7/2006 | Renz | B62B 3/02 280/79.11 |

* cited by examiner

*Primary Examiner* — John D Walters
(74) *Attorney, Agent, or Firm* — Norton Rose Fulbright Canada LLP

(57) ABSTRACT

A tray assembly is provided. The assembly comprises a tray, at least one width reinforcement component affixed to the tray, and at least one length reinforcement component affixed to the at least one reinforcement component.

7 Claims, 5 Drawing Sheets

CART/TRAY APPARATUS AND SYSTEM

CROSS-REFERENCE TO RELATED APPLICATIONS

This claims the benefit of U.S. Provisional Patent Application No. 63/304,322, filed on Jan. 28, 2022, the entire contents of which are incorporated herein by reference.

FIELD

The application relates generally to plant growing containers, and, more particularly, to a cart/tray apparatus and system including a tray assembly, and a cart or rolling bench assembly.

BACKGROUND

Plant growing trays are used to hold plants grown indoors or outdoors. These trays need to be able to hold soil and/or water or other nutrient fluid used to feed plants. There is a current propensity for plant growers to use a "clean room approach" to grow plants, often driven by regulation.

It is desirable to minimize costs of plant growing trays, and cart or rolling bench assemblies. This can cause the trays to be use low weight and made of a relatively thin plastic material that could be subject to bending, curving and/or twisting.

SUMMARY

In one embodiment, there is provided a tray assembly. The tray assembly comprises a tray, at least one width reinforcement component affixed to the tray, and at least one length reinforcement component affixed to the at least one reinforcement component.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE DRAWINGS

Embodiments will be described, by way of example only, with reference to the attached figures, wherein in the figures.

It is understood that throughout the description and figures, like features are identified by like reference numerals.

DETAILED DESCRIPTION

Embodiments of methods, systems, and apparatus are described through reference to the drawings.

Plant growing trays, especially for indoor applications, may need to be of varying sizes depending on the size of the growing room. Low cost trays may be low weight and made of a relatively thin plastic material that could be subject to bending, curving and/or twisting. This can cause leakage of soil and/or water from the trays. The length of a tray may be such that not much force is required to bend/curve/twist the tray. As such, adding relatively heavy legs and/or wheels to the tray could cause the tray to warp, bend or twist.

Plant growing trays should be able to hold the weight of plants and any accompanying material such as soil/nutrients/water. In indoor applications, any additional structures added to support the weight of plants in plant growing trays reduces the space available for growing plants, especially in "high-density indoor agriculture" motivated by reducing energy consumption. Leakage from plant growing trays may increase energy consumption and cost of growing plants by increasing irrigation needs. Plant nutrients are usually expensive and may be provided in the irrigation feed or otherwise supplied to the plants, e.g., by mixing with soil. Leakage in plant growing trays may substantially increase costs associated with a plant growing operation due to direct leakage of nutrient or premature flushing of nutrients from the plant growing tray because of frequent irrigation. Additionally, when trays are stacked, tray leakage may cause cross-contamination between different plants, which may have different irrigation (water, nutrients, etc.) requirements.

When plants are grown indoor, leakage may lead to undesirable mould growth. Twist-proof or warp-proof behaviour is important to prevent leakage, especially for indoor applications (0% leak tolerance or substantially 0% leak tolerance), and in certain applications of hydroponics where the soil is flooded first for maximum wettability (which may increase weight to one end of the tray thereby causing bending or twisting) and then drained.

In some embodiments, a tray assembly is provided that includes a reinforcement attachment and/or a leg attachment structure for agriculture trays. Adding optional legs and wheels may transform the tray assembly into a cart assembly or rolling bench assembly. Therefore, the present disclosure provides a way of providing a modular/lower cost solution for a tray, cart or rolling bench assembly. That is, a user need not purchase a tray and a separate cart or rolling bench. The components of the present disclosure allow for a single system to provide the tray, cart or rolling bench such that components may be added or removed to form the desired apparatus.

Figure 1:
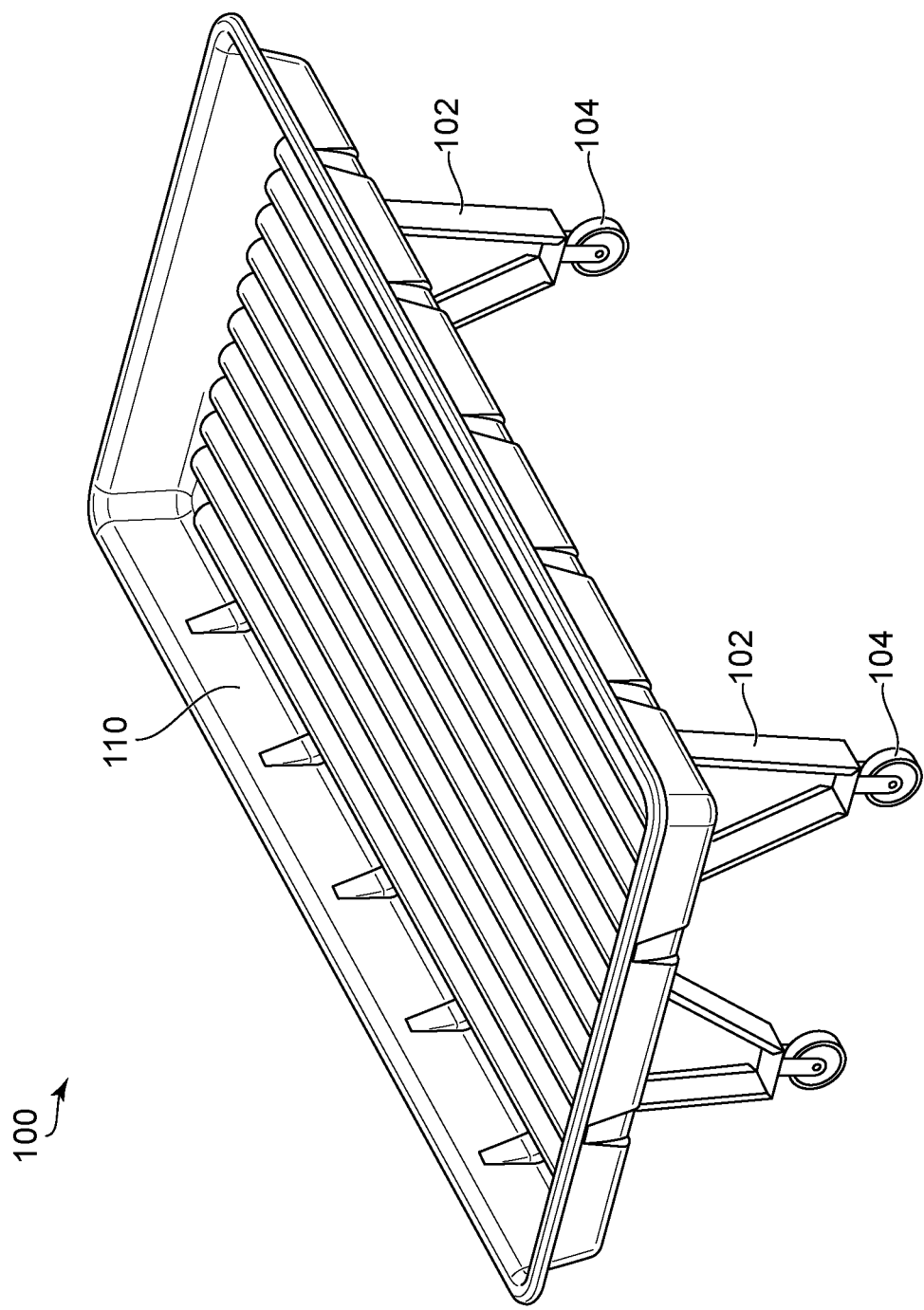
FIG. 1 illustrates, in a perspective view, an example of a tray assembly, in accordance with some embodiments.

FIG. 1 illustrates, in a perspective view, an example of a tray assembly 100, in accordance with some embodiments. The tray assembly 100 may comprise a tray 110 and optional legs 102 and/or wheels 104. Other components may be added to the tray assembly 100.

Figure 2:
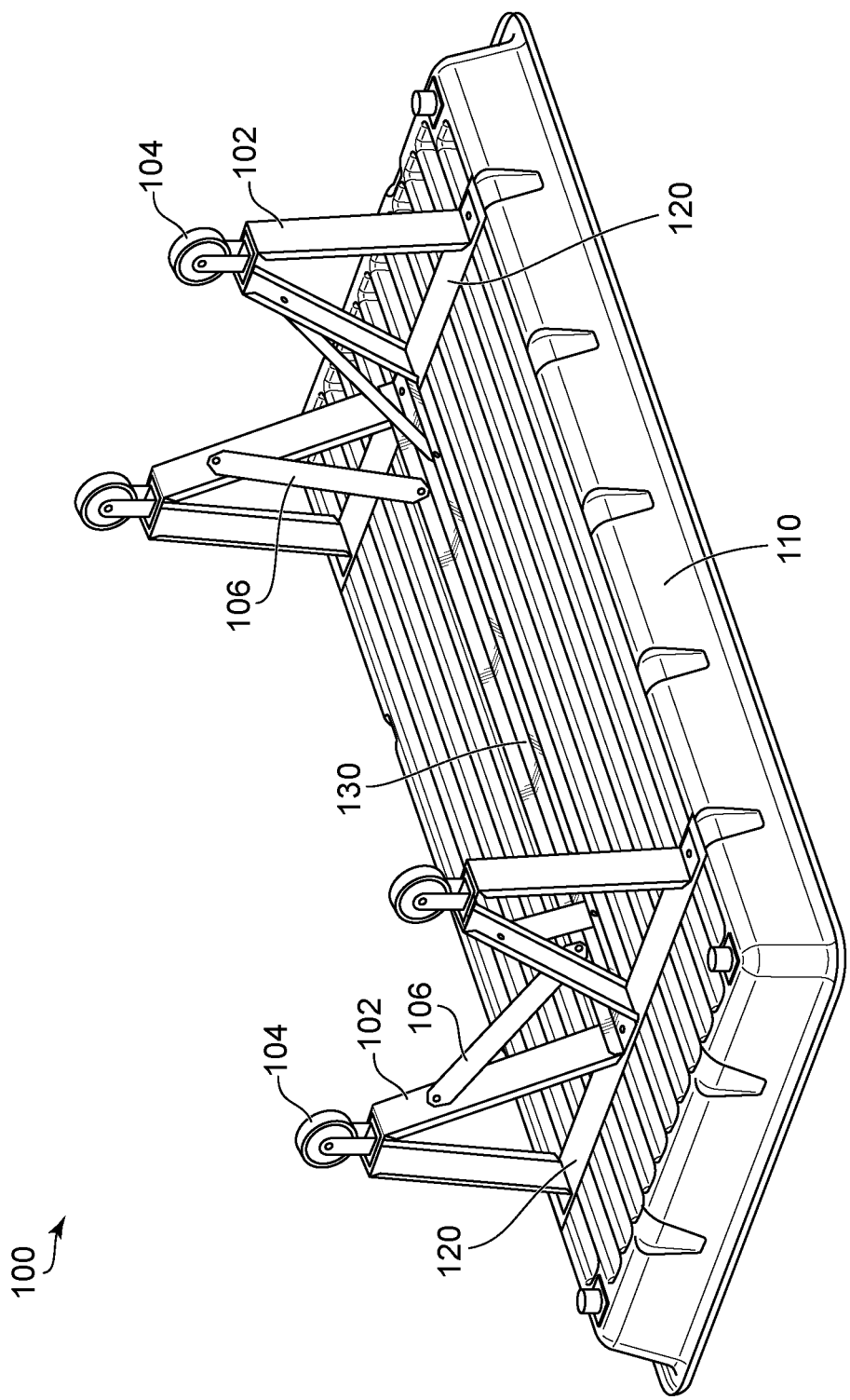
FIG. 2 illustrates an underside view of the example tray assembly, in accordance with some embodiments.

FIG. 2 illustrates an underside view of the example tray assembly 100, in accordance with some embodiments. The tray assembly 100 may comprise the tray 110, at least one width reinforcement component 120 (or reinforcement strip 120) and at least one length reinforcement component 130

(or reinforcement bar 130). Optionally, legs 102 and/or wheels 104 may be added to the tray assembly 100. The optional legs 102 and/or wheels 104 may be affixed to the reinforcement component that is attached to the tray 110. In the example shown, legs 102 are attached to the reinforcement strip 120. The tray 110 may be made of a relatively thin plastic material. In some embodiments, the tray 110 may be formed with relatively deep ribs/ridges to create a stronger tray prior to adding additional support from reinforcement strips 120 and reinforcement bar 130. These formed ribs may also create pockets that are deep enough on the underside of the tray so as to allow nuts and bolts for mounting the legs 102, castor or wheels 104, reinforcement bar 130, etc. without having to perforate the trays 110. The ribs that are formed in the trays 110 may be of varying size, height or other dimension.

Figure 3:
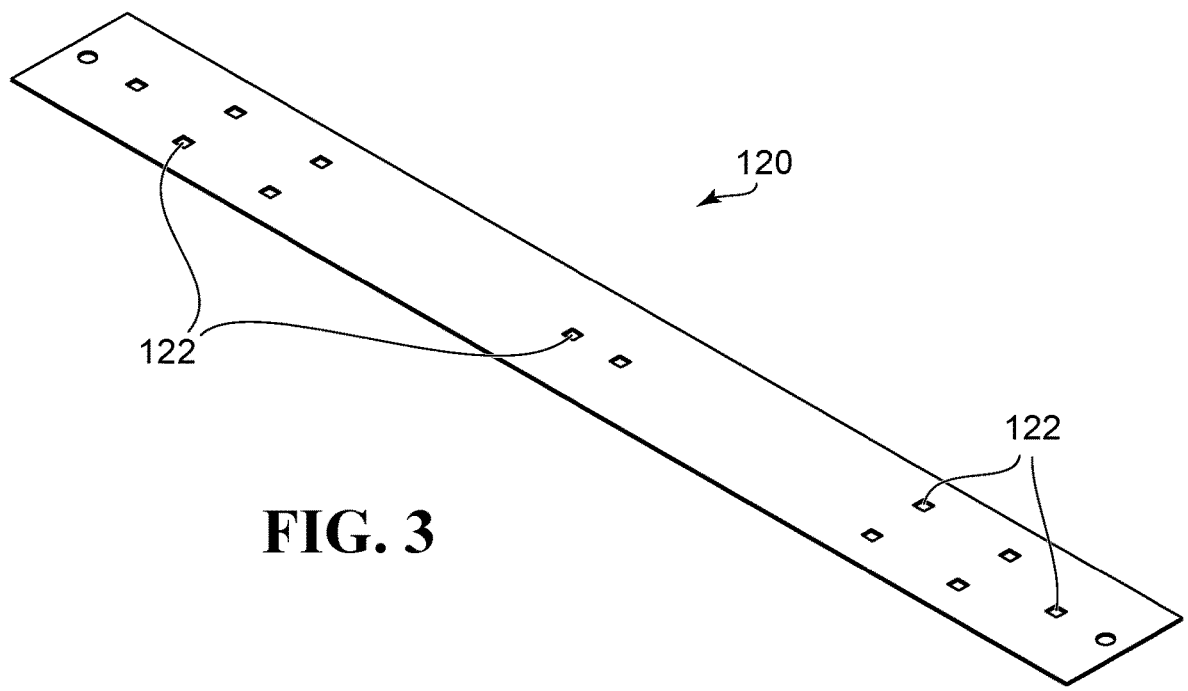
FIG. 3 illustrates, in a perspective view, an example of a reinforcement strip, in accordance with some embodiments.

FIG. 3 illustrates, in a perspective view, an example of a reinforcement strip 120, in accordance with some embodiments. The at least one width reinforcement component or strip 120 can be added/affixed to the bottom of the tray 110 using any adhesive or other attachment means. The reinforcement strips 120 may provide some additional strength to the tray 110, and allow for legs 102 and/or wheels 104 to be added to the reinforcement strips 120 rather than to the tray 110 itself. Therefore, no holes in the tray 110 are required to add legs 102 and/or wheels 104. In some embodiments, the reinforcement strips 120 are of sufficient depth to include cavities or holes 122 for receiving screws holding a leg 102 or length reinforcement component 130. In some embodiments, the bottom of tray 110 may include recessed sections where reinforcement strips 120 may be installed. In some embodiments, the reinforcement strips 120 may be added throughout the bottom of tray 110, including forming a square along a relative peripheral of the bottom of the tray, forming an X-shape or diagonal cross over such that each end of a reinforcement strip 120 is at an opposite corner of the tray 110. Reinforcement components 120 may also be shaped made in any desirable configuration or shape (i.e., not just individual strips, but structures such as squares, X-shapes, etc.).

Figure 4:
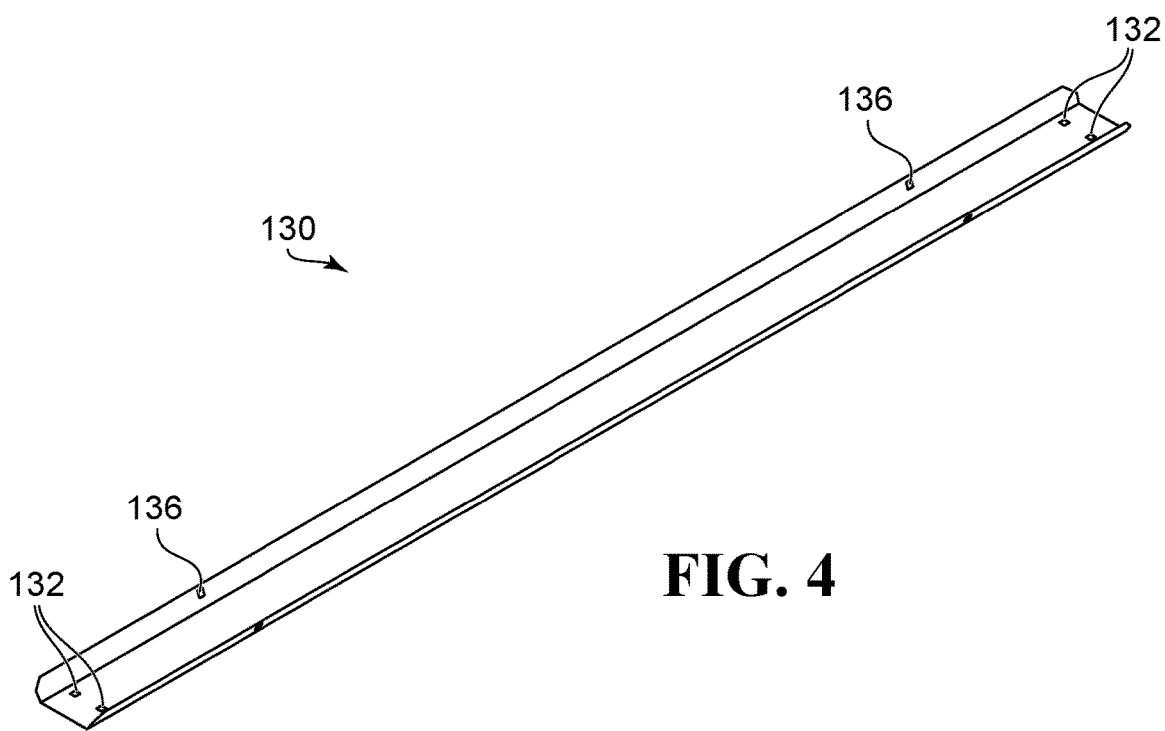
FIG. 4 illustrates, in a perspective view, an example of a reinforcement bar, in accordance with some embodiments.

FIG. 4 illustrates, in a perspective view, an example of a reinforcement bar 130, in accordance with some embodiments. The at least one length reinforcement component or bar 130 may also be used to add integrity to the tray 110. Again, the reinforcement bar 130 may be attached to the reinforcement strips 120 to avoid puncturing holes in the tray 110 (i.e., the reinforcement bar 130 may include cavities or holes 132 at each end that line up with cavities or holes 122 in the reinforcement strips 120 to screw or otherwise affix the length reinforcement bar 130. In some embodiments, the reinforcement bar 130 may be installed relatively orthogonal to the reinforcement strips 120. In some embodiments, the reinforcement bar 130 may also be used to support the optional attachable legs 102 and/or wheels 104 by attaching an additional support bar 106 such that one end of a support bar 106 is attached to the leg 102 (e.g., using screws at cavity or holes 146 on the leg component 102 and corresponding cavity or holes 156 on the support bar 106) and the other end is attached to the reinforcement bar 130.

Figure 5:
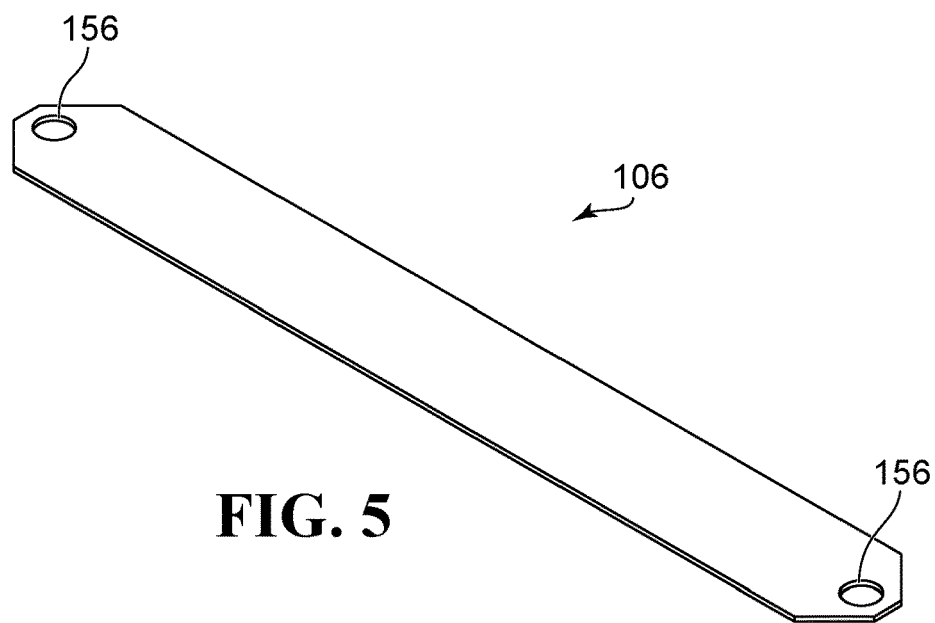
FIG. 5 illustrates, in a perspective view, an example of a support bar, in accordance with some embodiments.
Figure 6:
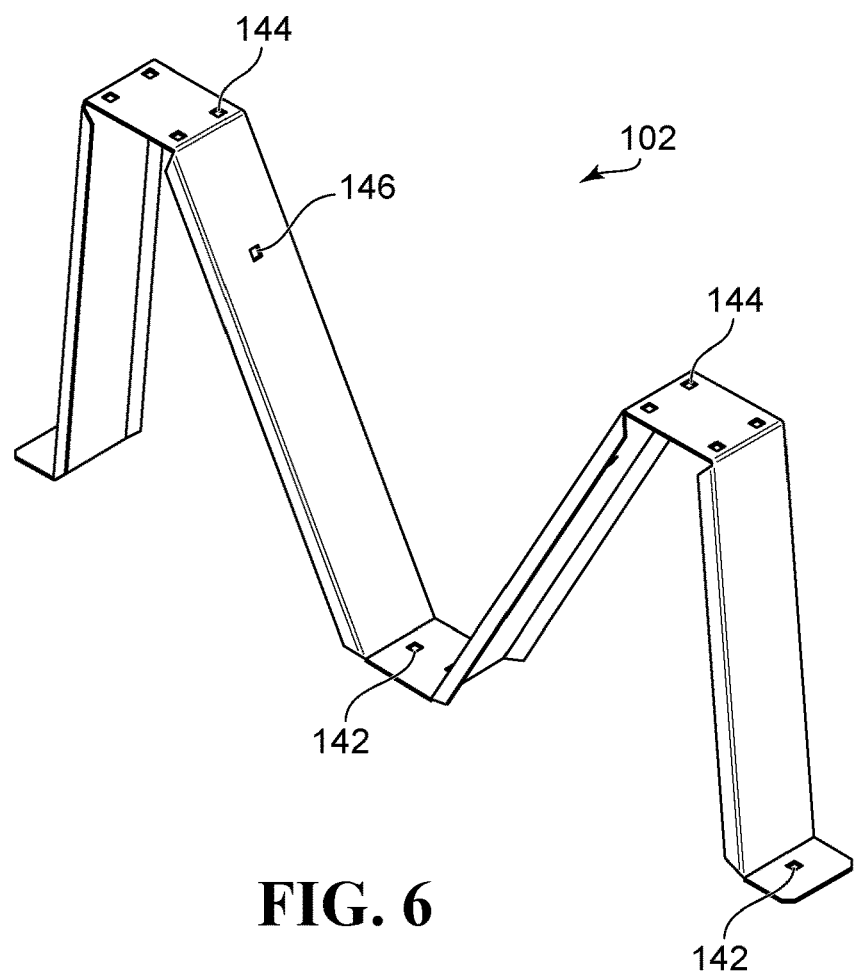
FIG. 6 illustrates, in a perspective view, an example of a leg component, in accordance with some embodiments.

FIG. 5 illustrates, in a perspective view, an example of a support bar 106, in accordance with some embodiments. FIG. 6 illustrates, in a perspective view, an example of a leg component 102, in accordance with some embodiments. In some embodiments, the leg component 102 may be affixed or screwed to a reinforcement strip 120 using the cavities or holes 142 on the leg component 102 and corresponding cavities or holes 122 on the reinforcement strip 120. In some embodiments, the leg component 102 may be manufactures to have bendable segments so that the leg component 102 may be shipped flat and folded into position by a user prior to installation.

In some embodiments, castors or wheels 104 may be mounted on either the leg component 102 using cavities or holes 144. Alternatively, the castors or wheels 104 may be mounted directly on the reinforcement strip 120 using cavities or holes 122. The reinforcement bar 130 may be shaped such that lateral ends along the length of the reinforcement bar 130 are bent at an angle to allow support bars 106 to be screwed or otherwise affixed using cavities or holes 136 on the reinforcement bar 130 and corresponding cavities or holes 156 on the support bar. For example, the reinforcement bar 130 may be a U-shape bar as shown in FIG. 4. In some embodiments, the reinforcement bar 130 may be manufactures to have bendable segments so that reinforcement bar 130 may be shipped flat and folded into the U-shape (or other shape that is not flat) position by a user prior to installation.

In some embodiments, there could be additional reinforcement strips 120 and/or reinforcement bars 130 added based on the dimensions of the tray 110.

The present disclosure shows reinforcement bars 130 and reinforcement strips 120 such that the longer dimension of the tray is associated with the (length) reinforcement component or bar 130 and the shorter dimension of the tray is associated with the width reinforcement component or strips 120. It should be noted that the assembly 100 may include reinforcement bars 130 on a shorter dimension and reinforcement strips 120 on the longer dimension. In fact, depending on the size and dimensions of the tray, both reinforcement components (bars 130 and strips 120) may be placed in different configurations along the tray 110.

Figure 7:
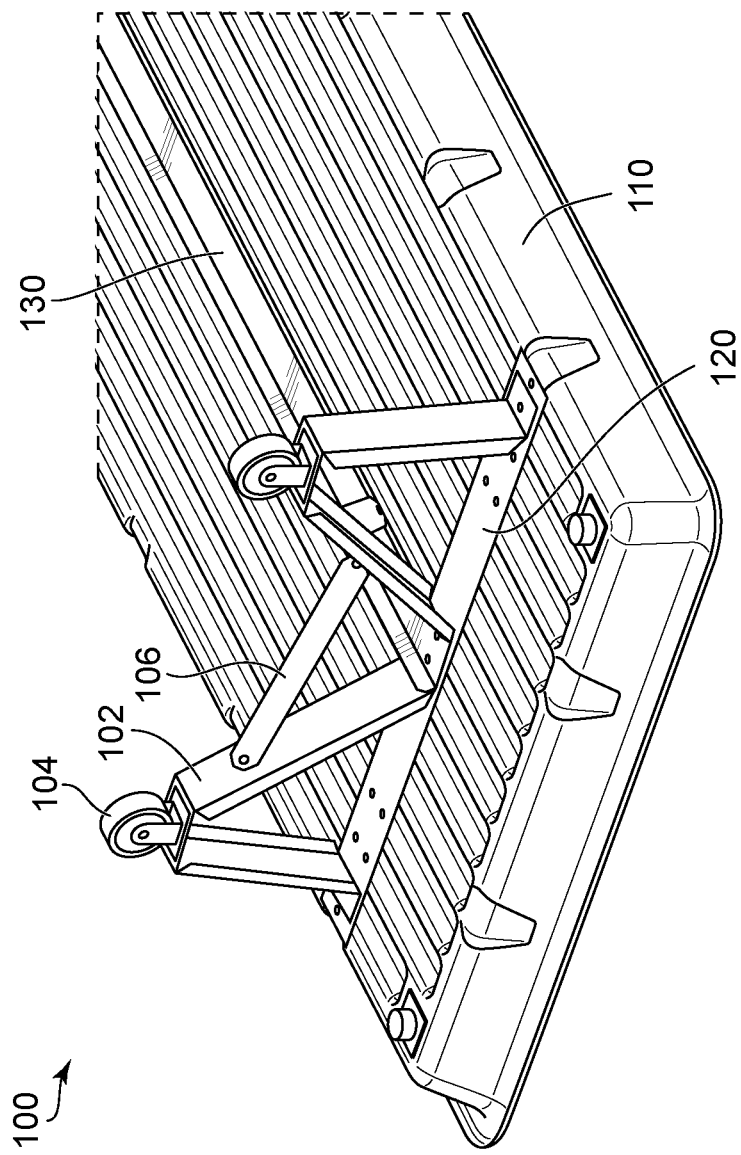
FIG. 7 illustrates, in a perspective view, one end of the underside of the tray assembly shown in FIG. 2, in accordance with some embodiments.

FIG. 7 illustrates, in a perspective view, one end of the underside of the tray assembly 100 shown in FIG. 2, in accordance with some embodiments. FIGS. 2 and 7 show the tray assembly with the legs 102 and wheels 104 structure attached to the reinforcement strips 120 with additional support by the reinforcement bar 130 using reinforcement strips 106. It should be noted that in other embodiments, legs 102 and/or wheels 104 may be attached to reinforcement bars 130 and optionally supported by a reinforcement strip 120.

In some embodiments, the trays 110 may be manufactured with the reinforcement strips 120 and/or reinforcement bar 130 attached. In some embodiments, the trays 110 may be shipped with the reinforcement bar 130 and optional legs 102 and/or wheels 104 to be installed after shipment. In some embodiments, wheels 104 may be attached or affixed to legs 102.

In some embodiments, the trays 110 may be stacked such that a grow cart is formed with an upper tray 110 separated from a lower tray 110 using vertical connecting components. For example, each corresponding corners of the upper and lower trays 110 may be connected to one end of a vertical connecting component to separate the upper and lower trays 110 a distance of approximately the length of the vertical connecting components. In some embodiments, one or more vertical connecting components may be added to connect the centres or other corresponding areas of the upper and lower trays 110 for extra support. Reinforcement strips 120 and bars 130 may be affixed to each of the upper and lower trays 110 for extra support. In some embodiments, reinforcement strips 120 may be added on both the top and bottom corners of each tray to allow for installation of the vertical connecting components. In some embodiments, additional structure or plastic molding may be added to the trays 110 to hold vertical connecting components in place.

The embodiments described in this document provide non-limiting examples of possible implementations of the present technology. Upon review of the present disclosure, a person of ordinary skill in the art will recognize that changes may be made to the embodiments described herein without departing from the scope of the present technology.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A tray assembly, comprising:
    a tray;
    at least one reinforcement strip affixed to the tray;
    at least one reinforcement bar affixed to the at least one reinforcement strip;
    a first leg structure and a second leg structure, each affixed to one of the at least one reinforcement strip at one end of the tray;
    a third leg structure and a fourth leg structure, each affixed to another of the at least one reinforcement strip at an opposite end of the tray; and
    at least one support bar, each support bar attached at one end to the reinforcement bar, and attached at an opposing end to one of the first leg structure, the second leg structure, the third leg structure or the fourth leg structure.

2. The tray assembly as claimed in claim 1, comprising:
    a first support bar attached at one end to the first leg structure and attached at an opposing end to the reinforcement bar;
    a second support bar attached at one end to the second leg structure and attached at an opposing end to the reinforcement bar;
    a third support bar attached at one end to the third leg structure and attached at an opposing end to the reinforcement bar; and
    a fourth support bar attached at one end to the fourth leg structure and attached at an opposing end to the reinforcement bar.

3. The tray assembly as claimed in any of claim 2, wherein the at least one reinforcement bar is U-shaped such that each lateral end along the length of the reinforcement bar allows for a support structure to be affixed.

4. The tray assembly as claimed in claim 1, comprising:
    at least one wheel, each wheel affixed to one of the leg structures.

5. The tray assembly as claimed in claim 1, wherein the first and second leg structures comprise a first double leg structure, and wherein the third and fourth leg structures comprise a second double leg structure.

6. The tray assembly as claimed in claim 1, wherein the at least one reinforcement strip is affixed via an adhesive.

7. The tray assembly as claimed in claim 1, wherein the tray comprises at least one recess to house the at least one reinforcement strip.

\* \* \* \* \*